US012646809B2

(12) United States Patent
Chen et al.

(10) Patent No.: US 12,646,809 B2
(45) Date of Patent: Jun. 2, 2026

(54) TAB WELDED STRUCTURE, BATTERY CELL, AND POWER CONSUMING APPARATUS

(71) Applicant: CONTEMPORARY AMPEREX TECHNOLOGY (HONG KONG) LIMITED, Hong Kong (CN)

(72) Inventors: Congsheng Chen, Ningde (CN); Wenfa Lin, Ningde (CN); Yaoling Wen, Ningde (CN); Jiang Lin, Ningde (CN); Minghao Tang, Ningde (CN); Jia Lin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 357 days.

(21) Appl. No.: 18/464,945

(22) Filed: Sep. 11, 2023

(65) Prior Publication Data

US 2023/0420812 A1      Dec. 28, 2023

Related U.S. Application Data

(63) Continuation of application No. PCT/CN2021/127726, filed on Oct. 29, 2021.

(51) Int. Cl.
H01M 50/566 (2021.01)
H01M 50/103 (2021.01)

(52) U.S. Cl.
CPC ....... H01M 50/566 (2021.01); H01M 50/103 (2021.01)

(58) Field of Classification Search
CPC ......... B23K 2101/006; B23K 2101/36; B23K 2103/12; B23K 26/244; B23K 26/26;
(Continued)

(56) References Cited

U.S. PATENT DOCUMENTS 9,761,855 B2      9/2017   Tsutsumi et al.
2012/0189904 A1      7/2012   Kawada et al.
(Continued)

FOREIGN PATENT DOCUMENTS

CN      102623744 A      8/2012
CN      104520057 A      4/2015
(Continued)

OTHER PUBLICATIONS

Machine translation CN111463369A (Year: 2020).*
(Continued)

*Primary Examiner* — Victoria H Lynch
(74) *Attorney, Agent, or Firm* — ANOVA LAW GROUP, PLLC

(57) ABSTRACT

A tab welded structure includes a conductive member and a tab formed by stacking a plurality of layers of pieces in a first direction. The conductive member is welded to the tab to form a fused area. The fused area includes a first fused portion and a second fused portion. The first fused portion extends from the tab into the conductive member in the first direction. The second fused portion is demarcated from the first fused portion, the second fused portion is located at a side portion of the first fused portion, and the second fused portion is configured to be connected to the first fused portion and the tab.

17 Claims, 7 Drawing Sheets

(58) Field of Classification Search
    CPC .. B23K 26/32; H01M 50/103; H01M 50/536;
                        H01M 50/566; Y02E 60/10
    See application file for complete search history.

(56)                References Cited

U.S. PATENT DOCUMENTS

| | | |
|---|---|---|
| 2014/0377625 A1 | 12/2014 | Tsutsumi et al. |
| 2019/0030645 A1 | 1/2019 | Tanaka |
| 2019/0381601 A1 | 12/2019 | Matsuo et al. |
| 2020/0373547 A1 | 11/2020 | Xu et al. |

FOREIGN PATENT DOCUMENTS

| | | | | |
|---|---|---|---|---|
| CN | 106602133 A | | 4/2017 | |
| CN | 109304557 A | | 2/2019 | |
| CN | 110614435 A | | 12/2019 | |
| CN | 111463369 A | * | 7/2020 | ............ H01M 50/10 |
| CN | 113399827 A | | 9/2021 | |
| JP | 2002313309 A | * | 10/2002 | |
| JP | 2004079563 A | | 3/2004 | |
| JP | 2011204552 A | | 10/2011 | |
| JP | 2019061949 A | | 4/2019 | |
| JP | 2020013745 A | | 1/2020 | |
| JP | 2022030243 A | | 2/2022 | |
| KR | 20150026768 A | | 3/2015 | |

OTHER PUBLICATIONS

Machine translation JP2002313309A (Year: 2002).*
Machine translation JP2020013745A (Year: 2020).*
The World Intellectual Property Organization (WIPO) International
Search Report and written opinion for PCT/CN2021/127726 Jul. 27,
2022 10 pages (including English translation).
The European Patent Office (EPO) The Extended European Search
Report for U.S. Appl. No. 21/961,956.6 Dec. 4, 2024 8 Pages.
The Japan Patent Office (JPO) Notice of Refusal for Application No.
2023-554039 Oct. 15, 2024 12 Pages (including translation).
The Korean Intellectual Property Office Request for the Submission
of an Opinion for Application No. 10-2023-7030376 Aug. 21, 2025
22 Pages (including translation).

* cited by examiner

TAB WELDED STRUCTURE, BATTERY CELL, AND POWER CONSUMING APPARATUS

CROSS-REFERENCE TO RELATED APPLICATION

This application is a continuation of International Application No. PCT/CN2021/127726, filed on Oct. 29, 2021, the entire content of which is incorporated herein by reference.

TECHNICAL FIELD

The present application relates to the technical field of batteries, and in particular to a tab welded structure, a battery cell, and a power consuming apparatus.

BACKGROUND ART

Achieving energy conservation and emission reduction is the key to the sustainable development of the automotive industry. Electric vehicles have become an important part of the sustainable development of the automotive industry due to their advantages in energy conservation and environmental protection. For the electric vehicles, the battery technology is an important factor to their development.

For a common battery cell, a tab is welded to a conductive member (a current collecting member, an electrode terminal, etc.) so as to facilitate the outputting of electric energy from the battery cell. At present, the tab is likely to be separated from the conductive member after the tab is welded to the conductive member, affecting the service life of the battery cell.

SUMMARY

Embodiments of the present application provide a tab welded structure, a battery cell and a power consuming apparatus, which can effectively improve the firmness of a tab after being welded to a conductive member.

In a first aspect, the embodiments of the present application provide a tab welded structure, including: a tab formed by stacking a plurality of layers of pieces in a first direction; and a conductive member welded to the tab to form a fused area; wherein the fused area includes: a first fused portion extends from the tab into the conductive member in the first direction; and a second fused portion demarcated from the first fused portion, the second fused portion being located at a side portion of the first fused portion, and the second fused portion being configured to be connected to the first fused portion and the tab.

In the above technical solution, the second fused portion is located at the side portion of the first fused portion, the second fused portion functions to connect the first fused portion to the tab, in other words, the first fused portion and the tab are fused together by means of the second fused portion, reducing the risk of cracking due to direct connection between the tab and the first fused portion, improving the firmness of the tab after being welded to the conductive member, and prolonging the service life of the battery cell.

In some embodiments, the second fused portion has a fusion depth less than that of the first fused portion in the first direction.

In the above technical solution, the fusion depth of the second fused portion is less than that of the first fused portion, so that a dimension of the first fused portion in the first direction is relatively large, and a dimension of the second fused portion in the first direction is relatively small. The dimension of the first fused portion in the first direction is relatively large, and a depth of the fused area is relatively large, ensuring the firmness of the tab after being welded to the conductive member. The dimension of the second fused portion in the first direction is relatively small, and the second fused portion functions well to connect the first fused portion to the tab, reducing the risk of cracking at a tab welding position.

In some embodiments, in the first direction, the second fused portion does not extend beyond the tab in a direction in which the tab faces the conductive member.

In the above technical solution, the second fused portion does not extend beyond the tab in the direction in which the tab faces the conductive member, so that the second fused portion does not extend into the conductive member, reducing the risk of cracking between the second fused portion and the tab due to the excessively large depth of the second fused portion.

In some embodiments, a welding temperature at which the conductive member and the tab are welded to form the second fused portion is less than a welding temperature at which the conductive member and the tab are welded to form the first fused portion.

In the above technical solution, the welding temperature at which the second fused portion is formed is less than the welding temperature at which the first fused portion is formed, so that a depth of the first fused portion can be greater than a depth of the second fused portion, and the depth of the fused area is great, thereby ensuring the firmness of the tab after being welded to the conductive member. Since the welding temperature at which the second fused portion formed is relatively low, the tab is less likely to expand and deform during formation of the second fused portion, reducing the risk of cracking at a position where the second fused portion and the tab are connected to each other.

In some embodiments, the second fused portion is arranged on an outer peripheral side of the first fused portion, and the second fused portion extends in a distributed manner in a peripheral direction of the first fused portion.

In the above technical solution, the second fused portion is located on the outer peripheral side of the first fused portion and extends in a distributed manner in the peripheral direction of the first fused portion, so that the tab is less likely to crack in multiple locations of the first fused portion, improving the firmness of the tab after being welded to the conductive member.

In some embodiments, in the first direction, the tab and the conductive member are arranged in a stacked manner, and the first fused portion penetrates the tab and partially extends into the conductive member.

In the above technical solution, the tab and the conductive member are arranged in a stacked manner in the first direction, and the first fused portion penetrates the tab and partially extends into the conductive member, so that a good firmness of the tab is provided after being welded to the conductive member. The tab may be welded to the conductive member by means of penetration welding to form the first fused portion and the second fused portion so as to reduce welding difficulty.

In some embodiments, in a second direction, at least one side of the first fused portion is provided with the second fused portion; wherein the second direction is perpendicular to the first direction.

In the above technical solution, at least one side of the first fused portion in the second direction is provided with the second fused portion, and the second fused portion functions to connect the first fused portion to the tab on one side or two sides of the first fused portion in the second direction, simplifying a welding process and improving the welding efficiency.

In some embodiments, the conductive member includes: a body portion having an abutment face; and a protrusion protruding from the abutment face; and the tab abuts against the abutment face in the first direction, a welding seam is formed between the tab and the protrusion in a second direction, the fused area is formed at the welding seam, and the second direction is perpendicular to the first direction.

In the above technical solution, the tab abuts against the abutment face of the body portion, the welding seam is formed between the tab and the protrusion, and the fused area is formed at the welding seam, achieving straddle welding of the tab and the conductive member. Due to the fact that the fused area is formed at the welding seam between the tab and the protrusion, the tab is less affected by heat during welding, reducing the risk of cracking at the position where the second fused portion and the tab are connected to each other.

In a second aspect, the embodiments of the present application provide a battery cell, including a tab welded structure provided in any one of the embodiments described above.

In some embodiments, the battery cell includes an electrode terminal electrically connected to the tab, the electrode terminal being the conductive member.

In some embodiments, the battery cell includes: an electrode terminal; and a current collecting member configured to be connected to the electrode terminal and the tab to electrically connect the electrode terminal and the tab, the current collecting member being the conductive member.

In a third aspect, the embodiments of the present application provide a battery, including: a battery cell provided in any one of the embodiments described above; and a case configured to receive the battery cell.

In a fourth aspect, the embodiments of the present application provide a power consuming apparatus, including a battery according to any one of the embodiments described above.

In a fifth aspect, the embodiments of the present application provide a tab welding method, including: providing an electrode assembly provided with a tab, the tab being formed by stacking a plurality of layers of pieces in a first direction; providing a conductive member; and welding the tab to the conductive member to form a fused area; wherein the fused area includes: a first fused portion extends from the tab into the conductive member in the first direction; and a second fused portion demarcated from the first fused portion, the second fused portion being located at a side portion of the first fused portion, and the second fused portion being configured to be connected to the first fused portion and the tab.

In some embodiments, the welding of the tab to the conductive member to form a fused area comprises: performing a primary welding on the tab and the conductive member to form the first fused portion; and performing a secondary welding on the tab and the conductive member to form the second fused portion; wherein a welding temperature of the secondary welding is less than a welding temperature of the primary welding.

In the above technical solution, the welding temperature at which the primary welding is performed on the tab and the conductive member is relatively high, so that a depth of the first fused portion is relatively large, ensuring the firmness of the tab after being welded to the conductive member. The welding temperature at which the secondary welding is performed on the tab and the conductive member is relatively low, so that the tab is less likely to expand and deform during formation of the second fused portion, reducing the risk of cracking at a position where the second fused portion and the tab are connected to each other.

In some embodiments, the performing of a secondary welding on the tab and the conductive member comprises: performing multiple turns of welding on the tab and the conductive member in a peripheral direction from inside to outside so as to form the second fused portion.

In the above technical solution, by performing multiple turns of welding on the tab and the conductive member in the peripheral direction, the second fused portion extending in a distributed manner in the peripheral direction can be formed, and the tab is less likely to crack in multiple locations of the first fused portion, improving the firmness of the tab after being welded to the conductive member.

In some embodiments, a welding temperature of each turn gradually decreases from inside to outside.

In the above technical solution, the welding temperature of each turn gradually decreases from inside to outside, and a thermal influence on the tab caused by each turn of welding gradually decreases from inside to outside, further reducing the risk of cracking at the position where the second fused portion and the tab are connected to each other.

In a sixth aspect, the embodiments of the present application further provide a tab welding apparatus, including: a first provision device configured to provide an electrode assembly provided with a tab, the tab being formed by stacking a plurality of layers of pieces in a first direction; a second provision device configured to provide a conductive member; and a welding device configured to weld the tab to the conductive member such that the tab and the conductive member form a fused area; wherein the fused area includes: a first fused portion extends from the tab into the conductive member in the first direction; and a second fused portion demarcated from the first fused portion, the second fused portion being located at a side portion of the first fused portion, and the second fused portion being configured to be connected to the first fused portion and the tab.

BRIEF DESCRIPTION OF THE DRAWINGS

In order to more clearly describe the technical solutions of the embodiments of the present application, the accompanying drawings required in the embodiments will be described briefly below. It should be understood that the following accompanying drawings illustrate only some embodiments of the present application and therefore should not be construed as a limitation on the scope thereof. For those of ordinary skill in the art, other relevant accompanying drawings can also be obtained from these accompanying drawings without any creative effort.

5

Figure 6:
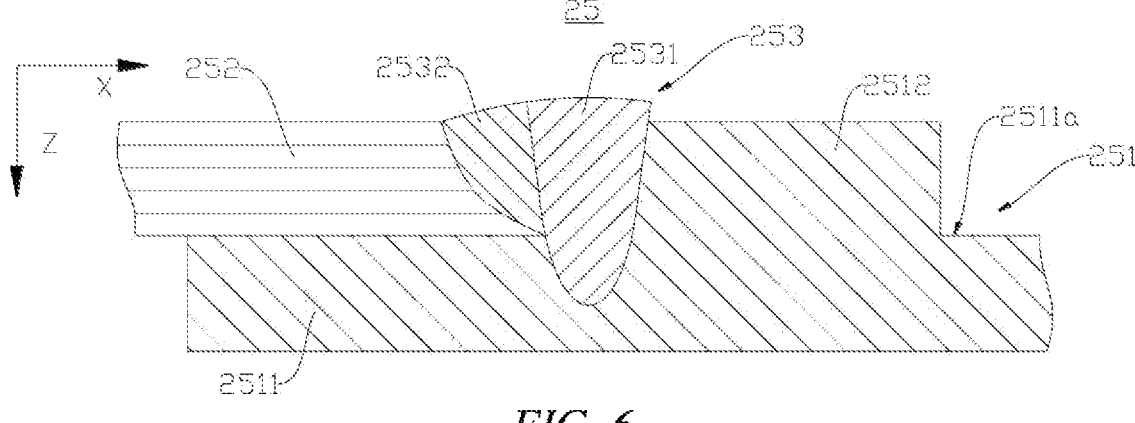
FIG. 6 is a cross-sectional view of a tab welded structure according to some other embodiments of the present application.
Figure 7:
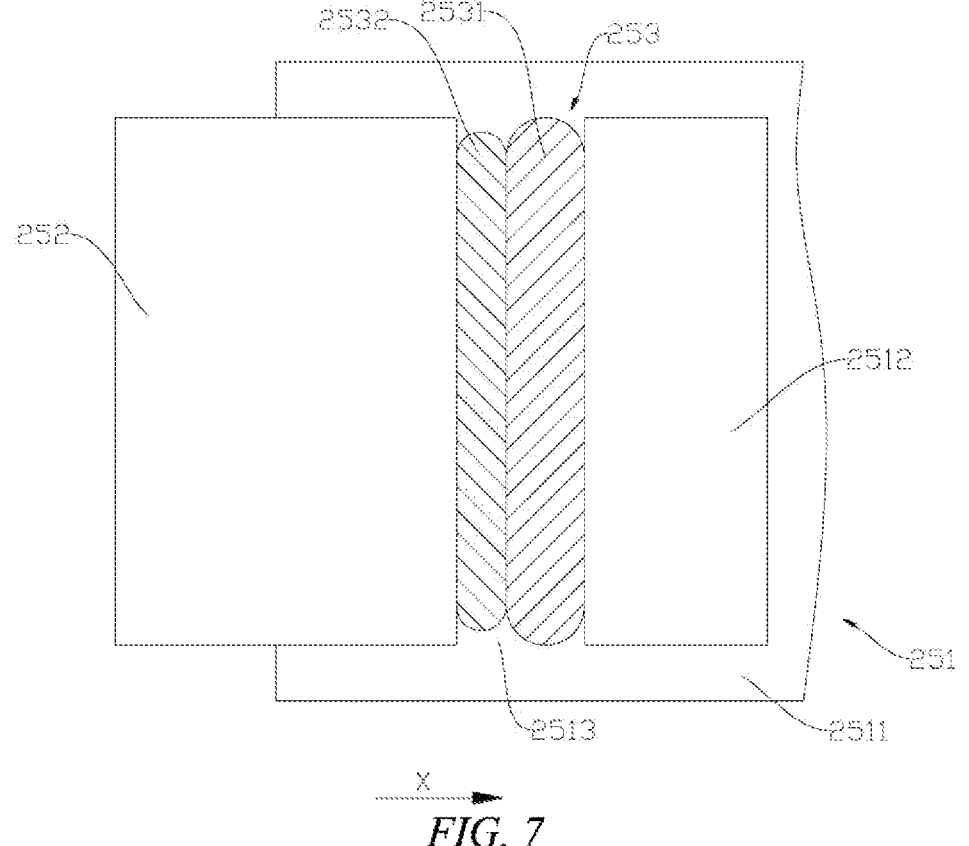
Figure 8:
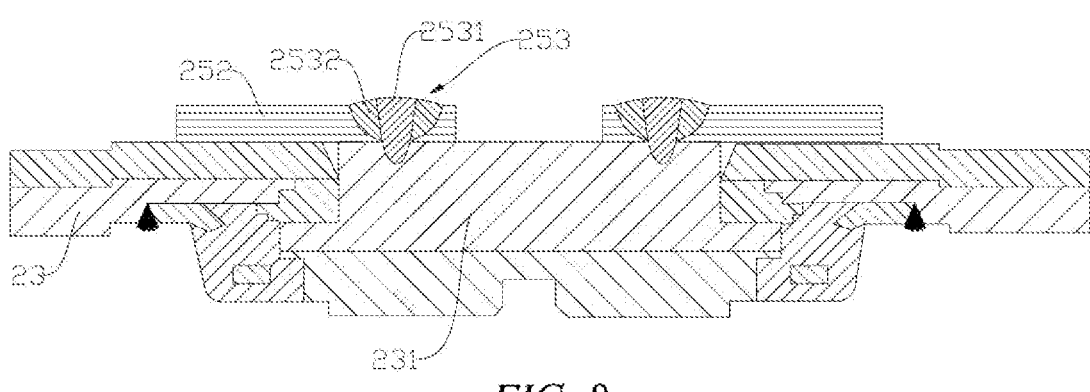
Figure 9:
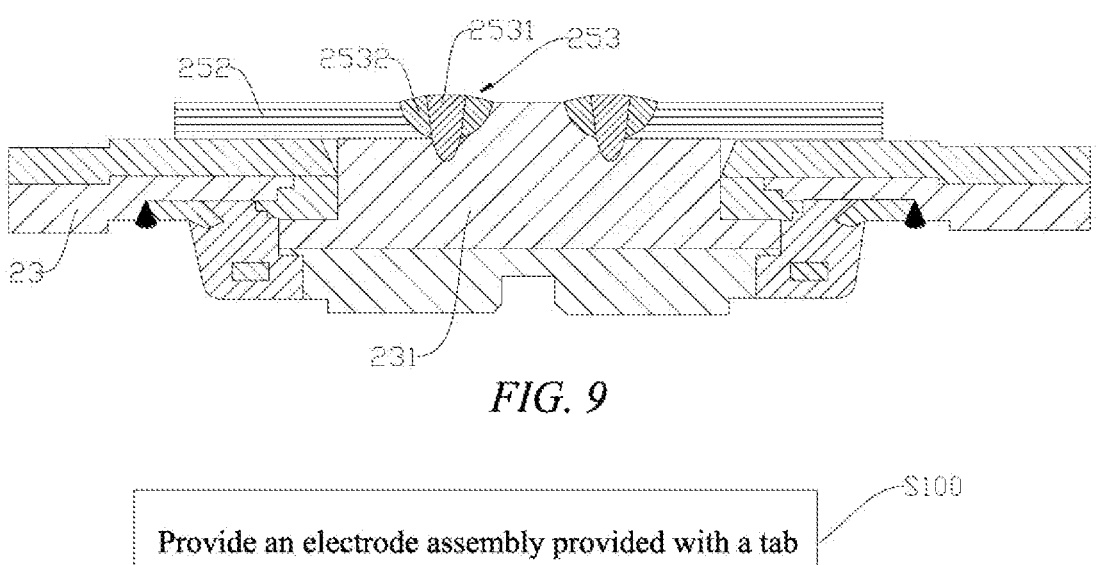
Figure 10:
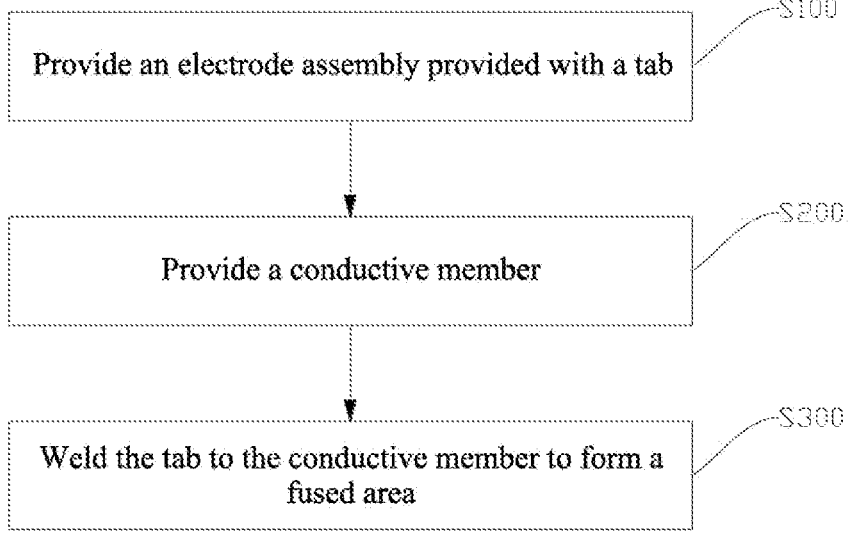
Figures 11, 12:
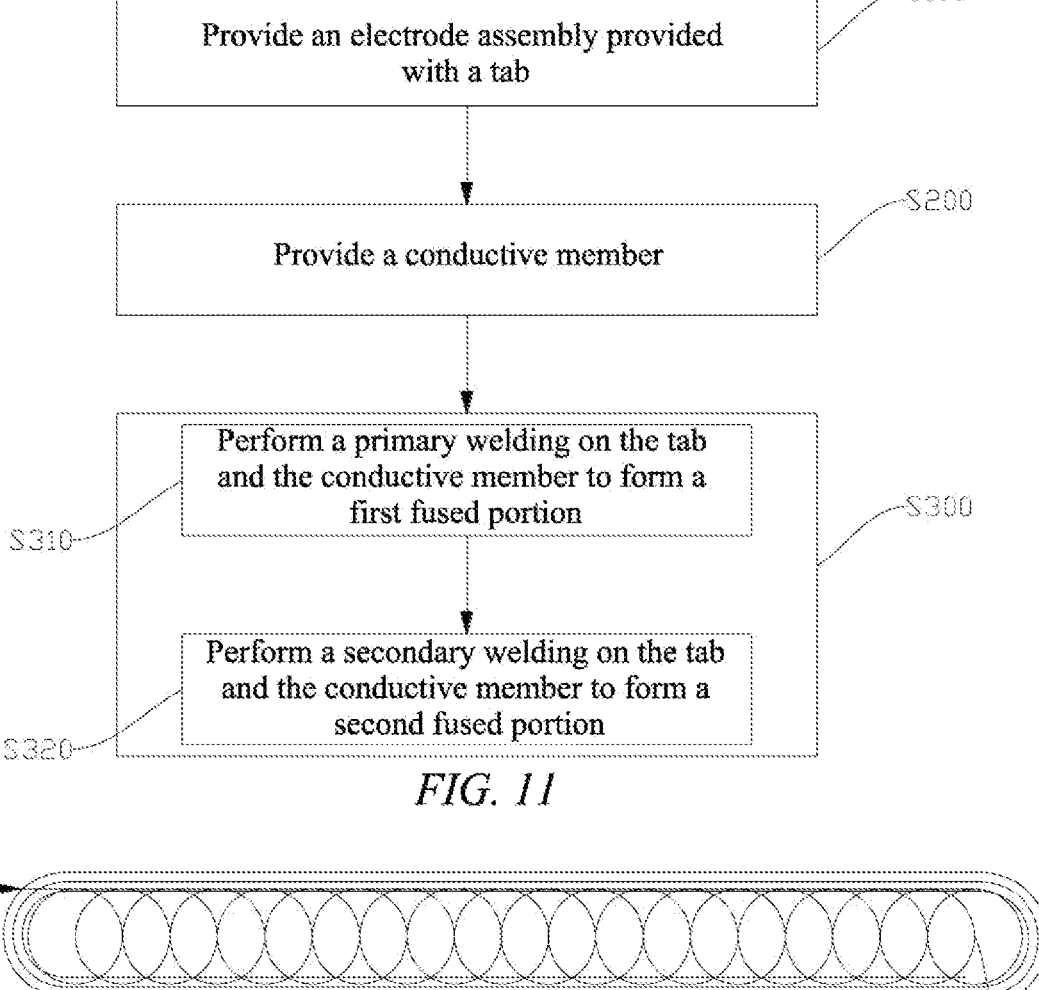
Figure 13:
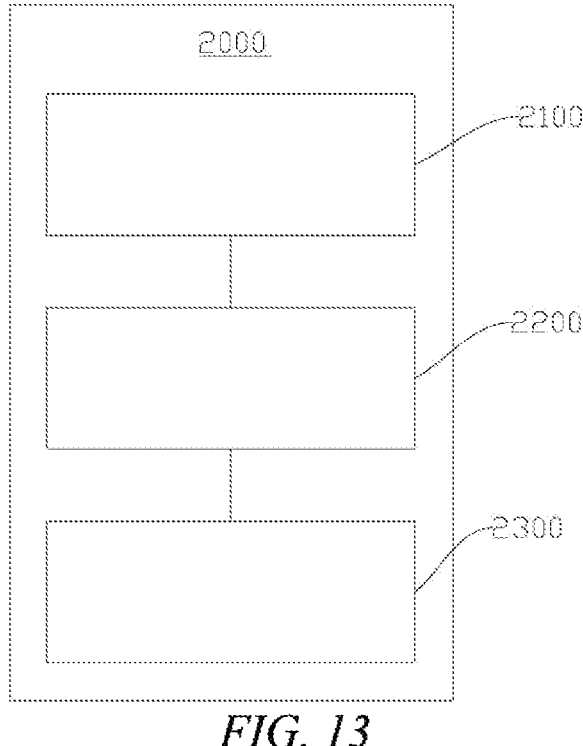

FIG. 7 is a top view of the tab welded structure shown in FIG. 6;

FIG. 8 is a diagram showing a welded structure of a tab and an electrode terminal of a battery cell according to some embodiments of the present application;

FIG. 9 is a diagram showing a welded structure of a tab and an electrode terminal of a battery cell according to some other embodiments of the present application;

FIG. 10 is a flowchart of a tab welding method according to some embodiments of the present application;

FIG. 11 is a flowchart of a tab welding method according to some other embodiments of the present application;

FIG. 12 is a diagram showing a welding track of a conductive member and a tab according to some embodiments of the present application; and FIG. 13 is a schematic block diagram of a tab welding apparatus according to some embodiments of the present application.

List of reference signs: 10—Case; 11—First portion; 12—Second portion; 20—Battery cell; 21—Housing; 22—Electrode assembly; 23—End cap; 231—Electrode terminal; 24—Pressure relief mechanism; 25—Tab welded structure; 251—Conductive member; 2511—Body portion; 2511a—Abutment face; 2512—Protrusion; 2513—Welding seam; 252—Tab; 253—Fused area; 2531—First fused portion; 2532—Second fused portion; 100—Battery; 200—Controller; 300—Motor; 1000—Vehicle; 2000—Welding apparatus; 2100—First provision device; 2200—Second provision device; 2300—Welding device; A—Secondary welding track; B—Primary welding track; Z—First direction; X—Second direction.

DETAILED DESCRIPTION OF EMBODIMENTS

In order to make the objectives, technical solutions and advantages of the embodiments of the present application clearer, the technical solutions in the embodiments of the pre sent application will be described clearly below with reference to the accompanying drawings in the embodiments of the present application. Obviously, the embodiments described are some of, rather than all of, the embodiments of the present application. All the other embodiments obtained by those of ordinary skill in the art based on the embodiments of the present application without any creative effort shall fall within the scope of protection of the present application.

Unless otherwise defined, all technical and scientific terms used in the present application have the same meanings as those commonly understood by those skilled in the art to which the present application belongs. The terms used in the description of the present application are merely for the purpose of describing specific embodiments, but are not intended to limit the present application. The terms "comprising" and "having" and any variations thereof in the description and the claims of the present application as well as the brief description of the accompanying drawings described above are intended to cover non-exclusive inclusion. The terms "first", "second", etc. in the description and the claims of the present application as well as the foregoing accompanying drawings are used to distinguish between different objects, rather than describing a specific order or a primary-secondary relationship.

In the present application, the phrase "embodiment" mentioned means that the specific features, structures, or characteristics described with reference to the embodiments can be encompassed in at least one embodiment of the present application. The phrase at various locations in the description does not necessarily refer to the same embodiment, or an independent or alternative embodiment exclusive of another embodiment.

In the description of the present application, it should be noted that, the terms "mount", "connected", "connect", or "attach" should be interpreted in a broad sense unless explicitly defined and limited otherwise. For example, they may be a fixed connection, a detachable connection, or an integral connection; or may be a direct connection, an indirect connection by means of an intermediate medium, or internal communication between two elements. For those of ordinary skills in the art, the specific meanings of the foregoing terms in the present application may be understood according to specific circumstances.

In the embodiments of the present application, the same reference numerals denote the same components, and for the sake of brevity, the detailed description of the same components is omitted in different embodiments. It should be understood that the dimensions, such as thickness, length and width, of the various components in the embodiments of the present application illustrated in the accompanying drawings, as well as the dimensions, such as an overall thickness, length and width, of an integrated device are merely illustrative and should not be construed to limit the present application in any way.

The phrase "plurality of" appearing in the present application means two or more (including two).

In the present application, a battery cell may include a lithium-ion secondary battery, a lithium-ion primary battery, a lithium-sulfur battery, a sodium/lithium-ion battery, a sodium-ion battery or a magnesium-ion battery, etc., which is not limited by the embodiments of the present application. The battery cell may be cylindrical, flat, cuboid or in other shapes, which is also not limited in embodiments of the present application. The battery cells are generally classified into three types depending on the way of package: cylindrical battery cells, prismatic battery cells and pouch battery cells, which also will not be limited in the embodiments of the present application.

A battery mentioned in the embodiments of the present application refers to a single physical module including one or more battery cells to provide a higher voltage and capacity. For example, the battery mentioned in the present application may include a battery module, a battery pack, etc. The battery generally includes a case for packaging one or more battery cells. The case can prevent liquid or other foreign matters from affecting charging or discharging of the battery cell.

The battery cell includes an electrode assembly and an electrolyte. The electrode assembly is composed of a positive electrode plate, a negative electrode plate and a separator. The battery cell operates mainly by relying on movements of metal ions between the positive electrode plate and the negative electrode plate. The positive electrode plate includes a positive electrode current collector and a positive electrode active material layer. A surface of the positive electrode current collector is coated with the positive electrode active material layer, the positive electrode current collector not coated with the positive electrode active material layer protrudes from the positive electrode current collector coated with the positive electrode active material layer, and the positive electrode current collector not coated with the positive electrode active material layer serves as a positive tab. Taking a lithium ion battery as an example, the positive electrode current collector may be made of an aluminum, and the positive electrode active material may be lithium cobalt oxide, lithium iron phosphate, ternary lithium, lithium manganate, etc. The negative electrode plate includes a negative electrode current collector and a negative electrode active material layer. A surface of the negative electrode current collector is coated with the negative electrode active material layer, the negative electrode current collector not coated with the negative electrode active material layer protrudes from the negative electrode current collector coated with the negative electrode active material layer, and the negative electrode current collector not coated with the negative electrode active material layer serves as a negative tab. The negative current collector may be made of copper, and the negative electrode active material may be carbon, silicon, etc. In order to ensure that no fusing occurs when a large current passes, there are a plurality of positive tabs stacked together, and there are a plurality of negative tabs stacked together. The separator may be made of PP (polypropylene), PE (polyethylene), etc. In addition, the electrode assembly may be of a wound structure or a laminated structure, which will not be limited in the embodiments of the present application.

In the battery cell, a tab is generally welded to a conductive member (a current collecting member, an electrode terminal, etc.) so as to facilitate the outputting of electric energy from the battery cell.

The inventors have found that a fused portion formed by welding the tab to the conductive member requires a sufficient depth to ensure a good firmness of the tab after being welded to the conductive member. However, the greater the depth of the fused portion, the higher the heat to which the tab is subjected during welding. Since the tab is formed by stacking a plurality of layers of pieces, the higher the temperature to which the tab is subjected, the more likely it is to expand and deform, resulting in cracking at a position where the tab and the fused portion are connected to each other, causing a phenomenon in which the conductive member and the tab are likely to fall off after the tab is welded to the conductive member, and thus affecting the service life of the battery cell.

In view of this, the embodiments of the present application provide a tab welded structure. The tab is welded to the conductive member to form a fused area, the fused area includes a first fused portion and a second fused portion demarcated from each other, the first fused portion extends from the tab into the conductive member in a first direction, the second fused portion and the first fused portion are demarcated from each other, the second fused portion is located at a side portion of the first fused portion, and the second fused portion is configured to be connected to the first fused portion and the tab.

In such a tab welded structure, the second fused portion functions to connect the first fused portion to the tab, in other words, the first fused portion and the tab are fused together by means of the second fused portion, reducing the risk of cracking due to direct connection between the tab and the first fused portion, improving the firmness of the tab after being welded to the conductive member, and prolonging the service life of the battery cell. In addition, since the fused area formed by welding the tab to the conductive member includes the first fused portion and the second fused portion, a current passing area between the conductive member and the tab is increased.

The technical solution described in the embodiments of the present application is applicable to a battery and a power consuming apparatus using the battery.

The power consuming apparatus may be a vehicle, a mobile phone, a portable device, a notebook computer, a ship, a spacecraft, an electric toy, an electric tool, etc. The vehicle may be a fuel vehicle, a gas vehicle or a new-energy vehicle. The new-energy vehicle may be a battery electric vehicle, a hybrid vehicle, an extended-range vehicle, etc. The spacecraft includes an airplane, a rocket, an aerospace plane, a spaceship, etc. The electric toy includes a stationary or mobile electric toy, such as a game machine, an electric toy car, an electric toy ship, and an electric toy airplane. The electric tool includes a metal cutting electric tool, a grinding electric tool, an assembling electric tool, and a railway electric tool, such as an electric drill, an electric grinder, an electric wrench, an electric screwdriver, an electric hammer, an electric impact drill, a concrete vibrator, and an electric planer. The power consuming apparatuses mentioned above are not specially limited in the embodiments of the present application.

For ease of description, an example in which the power consuming apparatus refers to a vehicle is used for description in the following embodiments.

Figure 1:
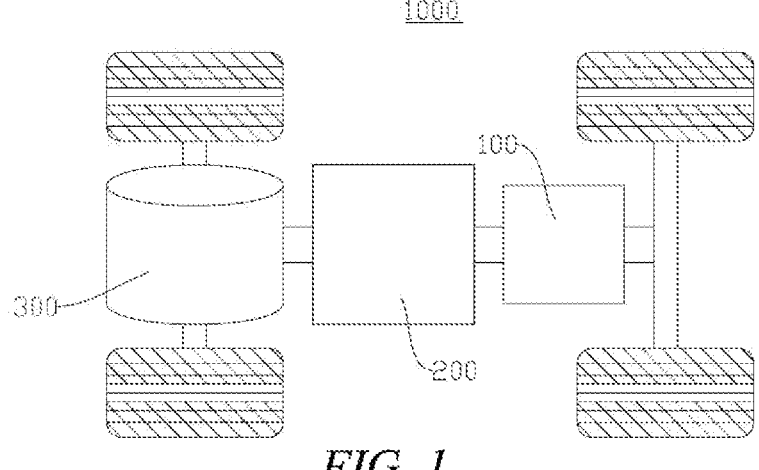
FIG. 1 is a schematic structural diagram of a vehicle according to some embodiments of the present application.

With reference to FIG. 1, FIG. 1 is a schematic structural diagram of a vehicle 1000 according to some embodiments of the present application, where a battery 100 is provided inside the vehicle 1000, and the battery 100 may be arranged at the bottom, the head, or the tail of the vehicle 1000. The battery 100 may be configured to supply power to the vehicle 1000. For example, the battery 100 may be used as a power supply for operating the vehicle 1000.

The vehicle 1000 may further include a controller 200 and a motor 300. The controller 200 is configured to control the battery 100 to supply power to the motor 300, for example, to meet working power requirements during starting, navigation and traveling of the vehicle 1000.

In some embodiments of the present application, the battery 100 can not only serve as a power supply for operating the vehicle 1000, but can also serve as a power supply for driving the vehicle 1000, in place of or partially in place of fuel or natural gas, to provide driving power for the vehicle 1000.

Figure 2:
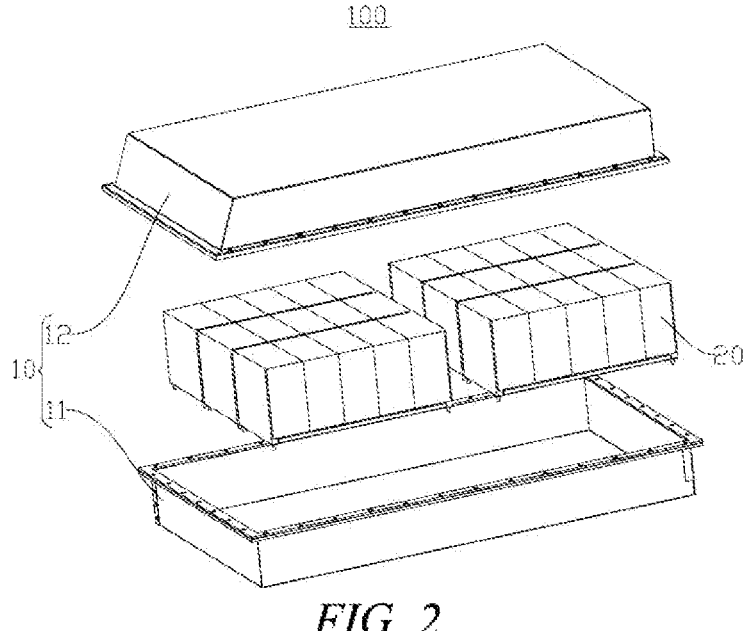
FIG. 2 is a schematic structural diagram of a battery according to some embodiments of the present application.

Referring to FIG. 2, FIG. 2 is a schematic structural diagram of a battery 100 according to some embodiments of the present application, where the battery 100 includes a case 10 and a battery cell 20, and the case 10 is configured to receive the battery cell 20.

The case 10 herein is a component for receiving the battery cell 20, the case 10 provides a receiving space for the battery cell 20, and the case 10 may be of various structures. In some embodiments, the case 10 may include a first portion 11 and a second portion 12. The first portion and the second portion 12 are fitted to each other in a covered manner to define the receiving space for receiving the battery cell 20. The first portion 11 and the second portion 12 may have various shapes such as a cuboid and a cylinder. The first portion 11 may be of a hollow structure with an open side, the second portion 12 may also be of a hollow structure with an open side, and the open side of the second portion 12 covers the open side of the first portion 11, such that the case 10 having the receiving space is formed. Alternatively, the first portion 11 is of a hollow structure with an open side, the second portion 12 is of a plate-like structure, and the second portion covers the open side of the first portion 11, such that the case 10 having the receiving space is formed. The first portion 11 and the second portion 12 may be sealed by a sealing element, which may be a sealing ring, a sealant, etc.

In the battery 100, one or more battery cells 20 may be provided. If a plurality of battery cells 20 are provided, the plurality of battery cells 20 may be connected in series, in parallel, or in series-parallel. The series-parallel connection refers that some of the plurality of battery cells 20 are connected in series and the rest are connected in parallel. It is possible that a plurality of battery cells 20 are first connected in series or in parallel or in series-parallel to form a battery module, and a plurality of battery modules are then connected in series or in parallel or in series-parallel to form a unit and are received in the case 10. It is also possible that all the battery cells 20 are directly connected in series, or in parallel, or in series-parallel, and a unit composed of all the battery cells 20 is then received in the case 10.

In some embodiments, the battery 100 may further include a busbar component, and the plurality of battery cells 20 may be electrically connected by means of the busbar component, so as to implement series connection, parallel connection, or series-parallel connection of the plurality of battery cells 20. The busbar component may be a metal conductor such as a copper conductor, an iron conductor, an aluminum conductor, a stainless steel conductor, and an aluminum alloy conductor.

Figure 3:
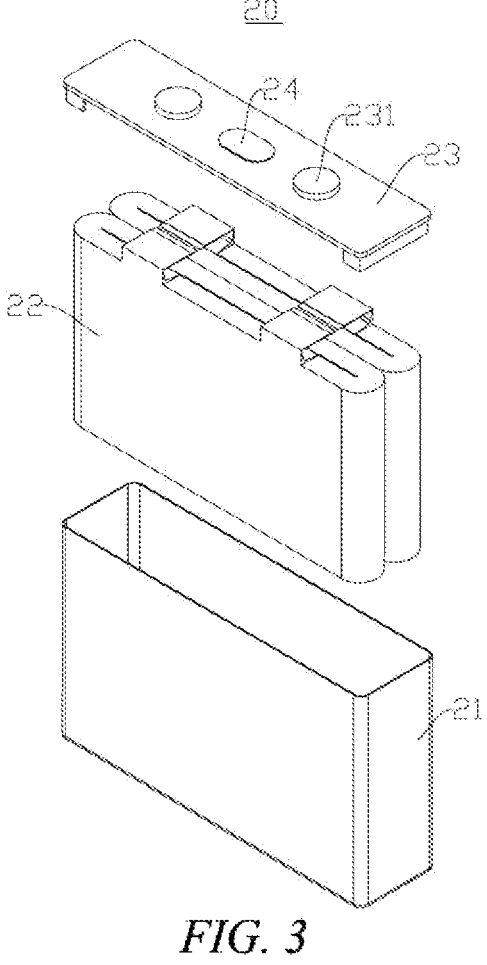
FIG. 3 is an exploded view of a battery cell according to some embodiments of the present application.

Referring to FIG. 3, FIG. 3 is an exploded view of the battery cell 20 according to some embodiments of the present application. The battery cell 20 includes a housing 21, an electrode assembly 22, an end cap 23 and a conductive member 251.

The housing 21 is a component configured to receive the electrode assembly 22, and the housing 21 may be of a hollow structure having an opening formed at one end. The housing 21 may have various shapes such as a cylinder and a cuboid. The housing 21 may be made of various materials, such as copper, iron, aluminum, steel, and aluminum alloy.

One or more electrode assemblies 22 may be provided in the housing 21. For example, as shown in FIG. 3, a plurality of electrode assemblies 22 are provided, and the plurality of electrode assemblies 22 are arranged in a stacked manner.

The electrode assembly 22 is a component where an electrochemical reaction occurs in the battery cell 20. The electrode assembly 22 may include a positive electrode plate, a negative electrode plate, and a separator. The electrode assembly 22 may be a wound structure formed by winding the positive electrode plate, the separator film and the negative electrode plate, or a stacked structure formed by arranging the positive electrode plate, the separator film, and the negative electrode plate in a stacked manner.

The positive electrode plate may include a positive electrode current collector and positive electrode active material layers coated on two opposite sides of the positive electrode current collector. The negative electrode plate may include a negative electrode current collector and negative electrode active material layers coated on two opposite sides of the negative electrode current collector. The electrode assembly 22 is provided with tabs 252. The tabs 252 are respectively a positive tab 252 and a negative tab 252. The positive tab 252 may be a portion of the positive electrode plate that is not coated with the positive electrode active material layer, and the negative tab 252 may be a portion of the negative electrode plate that is not coated with the negative electrode active material layer.

The end cap 23 is a component that covers the opening of the housing 21 to isolate an internal environment of the battery cell 20 from an external environment. The end cap 23 covers the opening of the housing 21, and the end cap 23 and the housing 21 jointly define a space for receiving the electrode assembly 22, the electrolyte and other components. The end cap 23 may be shaped to adapt to the shape of the housing 21. For example, the housing 21 is of a cuboid structure, and the end cap 23 is of a rectangular plate-like structure adapted to the housing 21. For another example, the housing 21 is of a cylinder structure, and the end cap 23 is of a circular plate-like structure adapted to the housing 21. The end cap 23 may also be made of various materials, such as copper, iron, aluminum, steel, and aluminum alloy. The end cap 23 may be of the same material as or a different material from the housing 21.

The conductive member 251 is a conductive component that is welded to tab 252, and the conductive member 251 is welded to the tab 252 to form a tab welded structure 25 (not shown in FIG. 3). The conductive member 251 may be an electrode terminal 231 provided on the end cap 23, or the conductive member 251 may be a current collecting member connected between the tab and the electrode terminal 231. If the conductive member 251 is an electrode terminal 231, the tab 252 is directly connected to the electrode terminal 231. If the conductive member 251 is a current collecting member, the tab 252 is indirectly connected the electrode terminal 231 via the current collecting member. The conductive member 251 may be a metal conductor such as a copper conductor, an iron conductor, an aluminum conductor, a steel conductor, and an aluminum alloy conductor.

In some embodiments, the battery cell 20 may further include a pressure relief mechanism 24. The pressure relief mechanism 24 is a component that relieves a pressure inside the battery cell 20. The pressure relief mechanism 24 is arranged on the end cap 23, and the pressure inside the battery cell 20 is relieved by means of the pressure relief mechanism 24 when the pressure or temperature inside the battery cell 20 reaches a threshold. The pressure relief mechanism 24 may be a component such as an explosion-proof valve, an explosion-proof plate, and a pressure relief valve.

In some embodiments, the battery cell 20 may further include an insulating member that is a component for separating the end cap 23 from the electrode assembly 22, the insulating member is arranged on the side of the end cap 23 facing the electrode assembly 22, and insulated isolation of the end cap 23 from the electrode assembly 22 is achieved by means of the insulating member. The insulating member is made of an insulating material, and the insulating member may be made of a material such as plastic and rubber.

Figure 4:
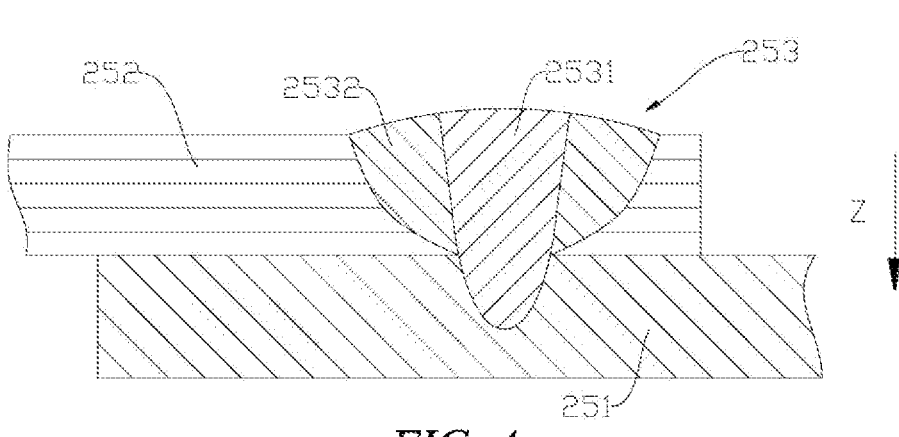
FIG. 4 is a cross-sectional view of a tab welded structure according to some embodiments of the present application.

Referring now to FIG. 4, FIG. 4 is a cross-sectional view of the tab welded structure 25 according to some embodiments of the present application. The embodiments of the present application provide a tab welded structure 25. The tab welded structure 25 includes a conductive member 251 and a tab 252 formed by stacking a plurality of layers of pieces in a first direction Z. The conductive member 251 is welded to the tab 252 to form a fused area 253.

The fused area 253 includes a first fused portion 2531 and a second fused portion 2532. The first fused portion 2531 extends from the tab 252 into the conductive member 251 in the first direction Z. The second fused portion 2532 and the first fused portion 2531 are demarcated from each other, the second fused portion 2532 is located at a side portion of the first fused portion 2531, and the second fused portion 2532 is configured to connect the first fused portion 2531 and the tab 252.

The tab 252 is of a multilayer structure, and the tab 252 is formed by stacking the plurality of layers of pieces in the first direction Z, and the first direction Z is a thickness direction of the pieces. Taking an example that the electrode assembly 22 (shown in FIG. 3) is of a wound structure, the electrode plates (the positive electrode plate and the negative electrode plate) form a plurality of plate-shaped sub-tabs arranged at intervals on one side in a width direction before winding, and after the electrode plates are wound, the plurality of sub-tabs are stacked together to form the tab 252. The sub-tabs may be the pieces forming the tab 252. The tab 252 may be welded to the plurality of layers of pieces in the tab 252 together before it is welded to the conductive member 251.

The conductive member 251 is a component that is welded to the tab 252 to form the fused area 253. In the battery cell 20, the conductive member 251 may be the electrode terminal 231, a current collecting member, etc.

The fused area 253 is a portion where the conductive member 251 and the tab 252 are welded and fused together. The first fused portion 2531 is a portion of the fused area 253 connected to the tab 252 and the conductive member 251, and the second fused portion 2532 is a portion of the fused area 253 connected to the first fused portion 2531 and the tab 252. The first fused portion and the second fused portion 2532 are demarcated from each other to form an interface at a position where the two portions are connected to each other, and the first fused portion 2531 and the second fused portion 2532 are respectively formed by two weldings. The first fused portion and the second fused portion 2532 have multiple demarcation forms. For example, the first fused portion 2531 and the second fused portion 2532 may be different in color such that the two portions are demarcated from each other. The first fused portion 2531 and the second fused portion may also be different in surface roughness such that the two portions are demarcated from each other.

The second fused portion 2532 is located at the side portion of the first fused portion 2531, and the second fused portion 2532 functions to connect the first fused portion 2531 to the tab 252, in other words, the first fused portion 2531 and the tab 252 are fused together by means of the second fused portion 2532, reducing the risk of cracking at a welding position of the tab 252 due to direct connection between the tab 252 and the first fused portion 2531, improving the firmness of the tab 252 after being welded to the conductive member 251, and prolonging the service life of the battery cell 20. In addition, since the fused area 253 formed by welding the tab 252 to the conductive member 251 includes the first fused portion 2531 and the second fused portion 2532, the current passing area between the conductive member 251 and the tab 252 is increased.

In some embodiments, with continued reference to FIG. 4, the second fused portion 2532 has a fusion depth less than that of the first fused portion 2531 in the first direction Z.

The fusion depth of the first fused portion 2531 is a dimension of the first fused portion 2531 in the first direction Z, and the fusion depth of the second fused portion 2532 is a dimension of the second fused portion 2532 in the first direction Z. The fusion depth of the second fused portion 2532 is less than that of the first fused portion 2531, so that a bottom end of the first fused portion 2531 is located at a deeper position than a bottom end of the second fused portion 2532.

Since the fusion depth of the second fused portion 2532 is less than that of the first fused portion 2531, the welding temperature at which the tab 252 is welded to the conductive member 251 to form the second fused portion 2532 is less than the welding temperature at which the tab 252 is welded to the conductive member 251 to form the first fused portion 2531, and during the formation of the second fused portion 2532, the tab 252 is less affected by heat, and the tab 252 is less susceptible to thermal expansion.

The dimension of the first fused portion 2531 in the first direction Z is relatively large, and the depth of the fused area 253 is relatively large, ensuring the firmness of the tab 252 after being welded to the conductive member 251. The dimension of the second fused portion 2532 in the first direction Z is relatively small, and the second fused portion 2532 functions well to connect the first fused portion 2531 to the tab 252, reducing the risk of cracking at the welding position of the tab 252.

In some embodiments, with continued reference to FIG. 4, in the first direction Z, the second fused portion 2532 does not extend beyond the tab 252 in the direction in which the tab 252 faces the conductive member 251.

As shown in FIG. 4, taking an example that the tab 252 is located on an upper side of the conductive member 251, the second fused portion 2532 does not extend beyond the tab 252 in the direction in which the tab 252 faces the conductive member 251, that is, the bottom end of the second fused portion 2532 is located in the tab 252, so that the fusion depth of the second fused portion 2532 in the first direction Z is not excessively large.

The greater the fusion depth of the second fused portion 2532, the greater the thermal influence on the tab 252 in the process of welding the tab 252 to the conductive member 251 to form the second fused portion 2532, and the more likely it is to expand and crack.

However, in the embodiments, the second fused portion 2532 does not extend beyond the tab 252 in the direction in which the tab 252 faces the conductive member 251, so that the second fused portion 2532 does not extend into the conductive member 251, reducing the risk of cracking between the second fused portion 2532 and the tab 252 due to the excessively large depth of the second fused portion 2532.

In some embodiments, the welding temperature at which the conductive member 251 is welded to the tab 252 to form the second fused portion 2532 is less than the welding temperature at which the conductive member 251 is welded to the tab 252 to form the first fused portion 2531.

In the process of welding the tab 252 to the conductive member 251, the welding temperature at which the second fused portion 2532 is formed is less than the welding temperature at which the first fused portion 2531 is formed, which can be achieved by making a welding power at which the second fused portion 2532 is formed less than a welding power at which the first fused portion 2531 is formed. Taking an example of laser-welding the tab 252 to the conductive member 251, the welding power at which the tab 252 and the conductive member 251 form the first fused portion 2531 by means of laser welding for the first time is a first welding power, and the welding power at which the tab 252 and the conductive member 251 form the second fused portion 2532 by means of laser welding for the second time is a second welding power less than the first welding power.

In the embodiments, the welding temperature at which the second fused portion 2532 is formed is less than the welding temperature at which the first fused portion 2531 is formed, so that the depth of the first fused portion 2531 can be greater than the depth of the second fused portion 2532, and the depth of the fused area 253 is great, thereby ensuring the firmness of the tab 252 after being welded to the conductive member 251. Since the welding temperature at which the second fused portion 2532 is formed is relatively low, the tab 252 is less likely to expand and deform during the formation of the second fused portion 2532, reducing the risk of cracking at the position where the second fused portion 2532 and the tab 252 are connected to each other.

Figure 5:
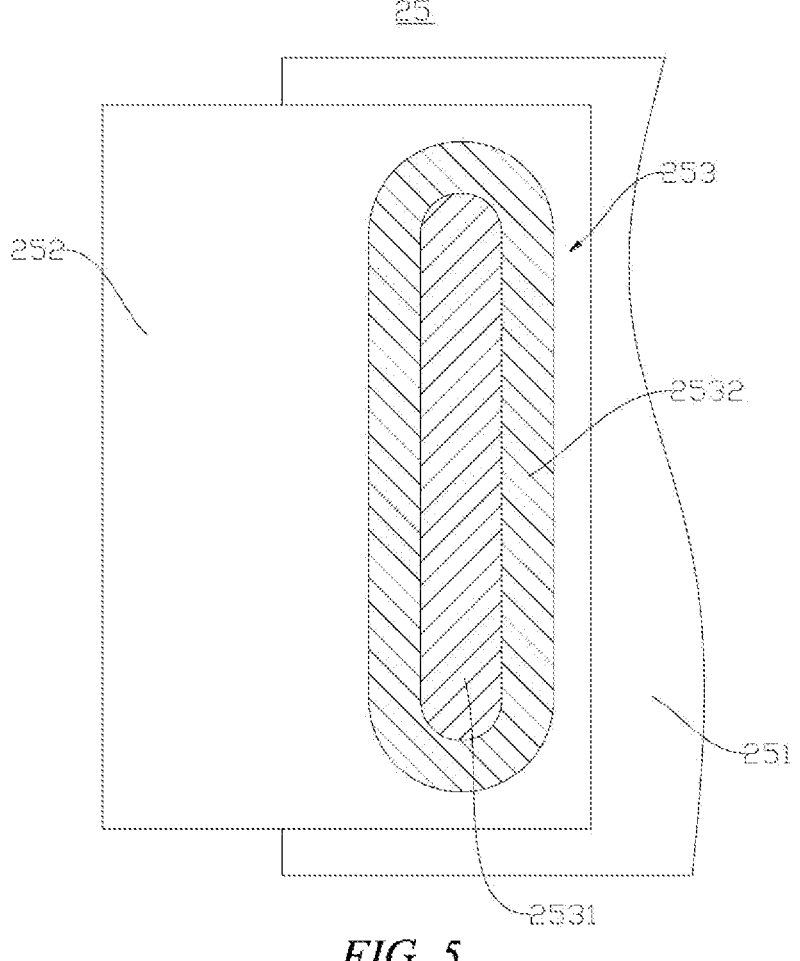
FIG. 5 is a top view of the tab welded structure shown in FIG. 4.

In some embodiments, referring to FIG. 5, FIG. 5 is a top view of the tab welded structure 25 shown in FIG. 4, the second fused portion 2532 is arranged on the outer peripheral side of the first fused portion 2531, and the second fused portion 2532 extends in a distributed manner in the peripheral direction of the first fused portion 2531.

The second fused portion 2532 is arranged on the outer peripheral side of the first fused portion 2531, that is, the first fused portion 2531 is located on the inner side of the second fused portion 2532. The second fused portion 2532 extends in a distributed manner in the peripheral direction of the first fused portion 2531, and the second fused portion 2532 may be a fully enclosed structure extending in the peripheral direction of the first fused portions 2531 and connected end to end, or may be a semi-enclosed structure extending in the peripheral direction of the first fused portion 2531 with a distance between ends.

In the embodiments, since the second fused portion 2532 is located on the outer peripheral side of the first fused portion 2531 and extends in a distributed manner in the peripheral direction of the first fused portion 2531, so that the tab 252 is less likely to crack in the multiple locations of the first fused portion 2531, improving the firmness of the tab 252 after being welded to the conductive member 251.

In some embodiments, as shown in FIGS. 4 and 5, in the first direction Z, the tab 252 and the conductive member 251 are arranged in the stacked manner, and the first fused portion 2531 penetrates the tab 252 and partially extends into the conductive member 251.

Taking an example that the tab 252 is located on the upper side of the conductive member 251, the first fused portion 2531 penetrates the tab 252 from top to bottom, and the bottom of the first fused portion 2531 extends into the conductive member 251 so that the first fused portion 2531 and the conductive member 251 are connected together.

In the embodiments, the tab 252 and the conductive member 251 are arranged in a stacked manner in the first direction Z, and the first fused portion 2531 penetrates the tab 252 and partially extends into the conductive member 251, so that a good firmness of the tab 252 is provided after being welded to the conductive member 251. The tab 252 may be welded to the conductive member 251 by means of penetration welding to form the first fused portion 2531 and the second fused portion 2532 so as to reduce welding difficulty.

In some embodiments, referring to FIGS. 6 and 7, FIG. 6 is a cross-sectional view of a tab 252 welded structure according to some other embodiments of the present application, and FIG. 7 is a top view of the tab welded structure 25 shown in FIG. 6, with the second fused portion 2532 provided on at least one side of the first fused portion 2531 in the second direction X. The second direction X is perpendicular to the first direction Z.

The second direction X is perpendicular to the first direction Z, the first direction Z is consistent with a direction of the fusion depth of the first fused portion 2531, and the second direction X may be consistent with a width direction of the first fused portion 2531. The second fused portion 2532 is provided on at least one side of the first fused portion 2531, it is possible to provide the second fused portion 2532 only on the side of the first fused portion 2531 close to the tab 252, or to provide the second fused portion 2532 on both the side of the first fused portion 2531 close to the tab 252 and the side of the first fused portion away from the tab 252. Illustratively, in FIGS. 6 and 7, in the second direction, the second fused portion 2532 is provided on the side of the first fused portion 2531 close to the tab 252, and no second fused portion 2532 is provided on the side of the first fused portion 2531 away from the tab 252.

In the embodiments, at least one side of the first fused portion 2531 in the second direction X is provided with the second fused portion 2532, and the second fused portion 2532 functions to connect the first fused portion 2531 to the tab 252 on one side or two sides of the first fused portion 2531 in the second direction X, simplifying the welding process and improving the welding efficiency.

In some embodiments, as shown in FIGS. 6 and 7, the conductive member 251 includes a body portion 2511 and a protrusion 2512. The body portion 2511 has an abutment face 2511a. The protrusion 2512 protrudes from the abutment face 2511a. The tab 252 abuts against the abutment face 2511a in the first direction Z, a welding seam 2513 is formed between the tab 252 and the protrusion 2512 in the second direction X, a fused area 253 is formed at the welding seam 2513, and the second direction X is perpendicular to the first direction Z.

The abutment face 2511a is a face of the body portion 2511 against which the tab 252 abuts. Illustratively, the abutment face 2511a is a flat face. The second direction X is perpendicular to the first direction Z, and the second direction X may be consistent with the width direction of the first fused portion 2531.

Illustratively, as shown in FIG. 6, the second fused portion 2532 is located on the side of the first fused portion 2531 close to the tab 252 in the second direction X. In the first direction Z, the fusion depth of the second fused portion 2532 is less than that of the first fused portion 2531, the bottom end of the second fused portion 2532 is located in the tab 252, and the bottom end of the first fused portion 2531 extends into the conductive member 251.

In the embodiments, the tab 252 abuts against the abutment face 2511a of the body portion 2511, the welding seam 2513 is formed between the tab 252 and the protrusion 2512, and the fused area 253 is formed at the welding seam 2513, achieving straddle welding of the tab 252 and the conductive member 251. Due to the fact that the fused area 253 is formed at the welding seam 2513 between the tab 252 and the protrusion 2512, the tab 252 is less affected by heat during welding, reducing the risk of cracking at the position where the second fused portion 2532 and the tab 252 are connected to each other.

The embodiments of the present application provide a battery cell 20, including a tab welded structure 25 provided in any one of the embodiments described above.

In some embodiments, referring to FIGS. 8 and 9, FIG. 8 is a diagram showing a welded structure of the tab 252 and the electrode terminal 231 of the battery cell 20 according to some embodiments of the present application, and FIG. 9 is a diagram showing a welded structure of the tab 252 and the electrode terminal 231 of the battery cell 20 according to some other embodiments of the present application. The battery cell 20 includes the electrode terminal 231, the electrode terminal 231 is electrically connected to the tab 252, and the electrode terminal 231 is the conductive member 251.

In FIG. 8, the tab 252 and the electrode terminal 231 form the fused area 253 by means of penetration welding. In FIG. 9, the tab 252 and the electrode terminal 231 form the fused area 253 by means of straddle welding.

As shown in FIGS. 8 and 9, in an embodiment where a plurality of electrode assemblies 22 (shown in FIG. 3) are included in the battery cell 20, the tabs 252 (such as the positive tabs 252) of some of the electrode assemblies 22 are welded to the electrode terminal 231, and the tabs 252 (such as the negative tabs 252) of the other electrode assemblies 22 are welded to the electrode terminal 231.

In some other embodiments, the battery cell 20 includes an electrode terminal 231 and a current collecting member. The current collecting member is configured to be connected to the electrode terminal 231 and the tab 252 so as to electrically connect the electrode terminal 231 to the tab 252, and the current collecting member is the conductive member 251.

The embodiments of the present application provide a battery 100, including a case 10 and a battery cell 20 provided in any one of the embodiments described above. The case 10 is configured to receive the battery cell 20.

The embodiments of the present application provide a power consuming apparatus, including the battery 100 provided in any one of the embodiments described above.

The power consuming apparatus may be any one of the devices using the battery 100 described above.

The embodiments of the present application provide a method for welding a tab 252. Referring to FIG. 10, FIG. 10 is a flowchart of the method for welding the tab 252 according to some embodiments of the present application. The method includes the flowing steps.

At step S100, an electrode assembly 22 provided with a tab 252 is provided, where the tab 252 is formed by stacking a plurality of layers of pieces in a first direction Z.

At step S200, a conductive member 251 is provided.

At step S300, the tab 252 is welded to the conductive member 251 to form a fused area 253.

The fused area 253 includes a first fused portion 2531 and a second fused portion 2532. The first fused portion 2531 extends from the tab 252 into the conductive member 251 in the first direction Z. The second fused portion 2532 and the first fused portion 2531 are demarcated from each other, the second fused portion 2532 is located at a side portion of the first fused portion 2531, and the second fused portion 2532 is configured to connect the first fused portion 2531 and the tab 252.

The tab 252 is welded to the conductive member 251 by means of the above method, in other words, the first fused portion 2531 and the tab 252 are fused together by means of the second fused portion 2532, reducing the risk of cracking at a welding position of the tab 252 due to direct connection between the tab 252 and the first fused portion 2531, improving the firmness of the tab 252 after being welded to the conductive member 251, and prolonging the service life of the battery cell 20. In addition, since the fused area 253 formed by welding the tab 252 to the conductive member 251 includes the first fused portion 2531 and the second fused portion 2532, the current passing area between the conductive member 251 and the tab 252 is increased.

In the above method, the order of steps S100 and S200 is not limited. Step S100 may be performed before step S200, or step S200 may be performed before step S100.

In some embodiments, referring to FIG. 11, FIG. 11 is a flowchart of a method for welding a tab 252 according to some other embodiments of the present application. Step S300 includes the flowing steps.

At step S310, a primary welding is performed on the tab 252 and the conductive member 251 to form a first fused portion 2531.

At step S320, a secondary welding is performed on the tab 252 and the conductive member 251 to form a second fused portion 2532.

A welding temperature of the secondary welding is less than a welding temperature of the primary welding.

In the embodiments of the present application, the order of steps S310 and S320 is not limited. Step S310 may be performed before step S320. For example, the primary welding is first performed on the tab 252 and the conductive member 251 to form the first fused portion 2531, and the secondary welding is then performed on an edge of the first fused portion 2531 to form the second fused portion 2532 for connecting the first fused portion 2531 and the tab 252 together. Alternatively, step S320 may be performed before step S310. For example, the secondary welding is first performed on the tab 252 and the conductive member 251 to form the second fused portion 2532, and the primary welding is then performed on an edge of the second fused portion 2532 to form the first fused portion 2531 for connecting the second fused portion 2532 and the conductive member 251 together.

The welding temperature of the secondary welding is less than the welding temperature of the primary welding, which may be achieved by making the welding power of the secondary welding less than the welding temperature of the primary welding. Taking an example of laser-welding the tab 252 to the conductive member 251, the welding power at which the second fused portion 2532 is formed by means of secondary laser welding is less than the welding power at which the first fused portion 2531 is formed by means of primary laser welding.

In the embodiments, the welding temperature at which the primary welding is performed on the tab 252 and the conductive member 251 is relatively high, so that the depth of the first fused portion 2531 is relatively large, ensuring the firmness of the tab 252 after being welded to the conductive member 251. The welding temperature at which the secondary welding is performed on the tab 252 and the conductive member 251 is relatively low, so that the tab 252 is less likely to expand and deform during the formation of the second fused portion 2532, reducing the risk of cracking at a position where the second fused portion 2532 and the tab 252 are connected to each other.

In some embodiments, the performing of a secondary welding on the conductive member and the tab 252 comprises: performing multiple turns of welding on the tab 252 and the conductive member 251 in a peripheral direction from inside to outside so as to form the second fused portion 2532.

Referring to FIG. 12, FIG. 12 is a diagram showing a welding track of the conductive member 251 and the tab 252 according to some embodiments of the present application. During the secondary welding performed on the conductive member 251 and the tab 252, they may be welded from inside to outside along a secondary welding track A. During the primary welding performed on the conductive member 251 and the tab 252, they may be welded in a spiral manner along a primary welding track B.

By performing multiple turns of welding on the tab 252 and the conductive member 251 in the peripheral direction, the second fused portion 2532 extending in a distributed manner in the peripheral direction of the first fused portion 2531 can be formed, and the tab 252 is less likely to crack in multiple locations of the first fused portion 2531, improving the firmness of the tab 252 after being welded to the conductive member 251.

In some embodiments, a welding temperature of each turn gradually decreases from inside to outside.

In the process of forming the second fused portion 2532 by performing the multiple turns of welding on the tab 252 and the conductive member 251 from inside to outside in the peripheral direction, the welding temperature of each turn gradually decreases from inside to outside, so that the fusion depth of the second fused portion decreases stepwise from inside to outside, the thermal influence of each turn of welding on the tab 252 gradually decreases from inside to outside, further reducing the risk of cracking at the position where the second fused portion 2532 and the tab 252 are connected to each other.

The embodiments of the present application further provide an apparatus 2000 for welding a tab 252. Referring to FIG. 13, FIG. 13 is a schematic block diagram of the apparatus 2000 for welding a tab 252 according to some embodiments of the present application. The welding apparatus 2000 includes a first provision device 2100, a second provision device 2200, and a welding device 2300.

The first provision device 2100 is configured to provide an electrode assembly 22 provided with the tab 252. The tab 252 is formed by stacking a plurality of layers of pieces in the first direction Z. The second provision device 2200 is configured to provide a conductive member 251. The welding device 2300 is configured to weld the tab 252 to the conductive member 251 such that the tab 252 and the conductive member 251 form a fused area 253.

The fused area 253 includes a first fused portion 2531 and a second fused portion 2532. The first fused portion 2531 extends from the tab 252 into the conductive member 251 in the first direction Z. The second fused portion 2532 and the first fused portion 2531 are demarcated from each other, the second fused portion 2532 is located at a side portion of the first fused portion 2531, and the second fused portion 2532 is configured to connect the first fused portion 2531 and the tab 252.

It should be noted that the embodiments in the present application and features in the embodiments may be combined with each other without conflicts.

The above embodiments are only used to explain the technical solutions of the present application, and are not intended to limit the present application, and various modifications and changes of the present application may be made by those skilled in the art. Any modifications, equivalent substitutions, improvements, and the like made within the spirit and principle of the present application should fall within the scope of protection of the present application.

What is claimed is:

1. A tab welded structure, comprising:
a tab formed by stacking a plurality of layers of pieces in a first direction; and
a conductive member welded to the tab to form a fused area;
wherein the fused area comprises:
a first fused portion extending from the tab into the conductive member in the first direction; and
a second fused portion demarcated from the first fused portion, the second fused portion being located at a side portion of the first fused portion, the second fused portion being configured to be connected to the first fused portion and the tab, and the second fused portion not extending into the conductive member;
wherein a welding temperature at which the conductive member and the tab are welded to form the second fused portion is less than a welding temperature at which the conductive member and the tab are welded to form the first fused portion.

2. The tab welded structure according to claim 1, wherein the second fused portion has a fusion depth less than a fusion depth of the first fused portion in the first direction.

3. The tab welded structure according to claim 1, wherein in the first direction, the second fused portion does not extend beyond the tab in a direction in which the tab faces the conductive member.

4. The tab welded structure according to claim 1, wherein the second fused portion is arranged on an outer peripheral side of the first fused portion, and the second fused portion extends in a distributed manner in a peripheral direction of the first fused portion.

5. The tab welded structure according to claim 4, wherein the second fused portion is a semi-enclosed structure with a distance between ends of the second fused portion.

6. The tab welded structure according to claim 1, wherein in the first direction, the tab and the conductive member are arranged in a stacked manner, and the first fused portion penetrates the tab and partially extends into the conductive member.

7. The tab welded structure according to claim 1, wherein in a second direction perpendicular to the first direction, at least one side of the first fused portion is provided with the second fused portion.

8. The tab welded structure according to claim 1, wherein:
the conductive member comprises:
a body portion having an abutment face; and
a protrusion protruding from the abutment face; and
the tab abuts against the abutment face in the first direction, a welding seam is formed between the tab and the protrusion in a second direction perpendicular to the first direction, and the fused area is formed at the welding seam.

9. A battery cell, comprising the tab welded structure according to claim 1.

10. The battery cell according to claim 9, wherein the conductive member is an electrode terminal of the battery cell, and the electrode terminal is electrically connected to the tab.

11. The battery cell according to claim 9, further comprising:
an electrode terminal;
wherein the conductive member is a current collecting member of the battery cell, and the current collecting member is configured to be connected to the electrode terminal and the tab to electrically connect the electrode terminal and the tab.

12. A battery, comprising:
the battery cell according to claim 9; and
a case configured to receive the battery cell.

13. A power consuming apparatus, comprising the battery according to claim 12.

14. A tab welding method, comprising:
providing an electrode assembly provided with a tab, the tab being formed by stacking a plurality of layers of pieces in a first direction;
providing a conductive member; and
welding the tab to the conductive member to form a fused area;
wherein the fused area comprises:
a first fused portion extending from the tab into the conductive member in the first direction; and
a second fused portion demarcated from the first fused portion, the second fused portion being located at a side portion of the first fused portion, the second fused portion being configured to be connected to the first fused portion and the tab, and the second fused portion not extending into the conductive member; and
wherein welding the tab to the conductive member to form the fused area comprises:
performing a primary welding on the tab and the conductive member to form the first fused portion; and performing a secondary welding on the tab and the conductive member to form the second fused portion;

wherein a welding temperature of the secondary welding is lower than a welding temperature of the primary welding.

15. The tab welding method according to claim 14, wherein performing the secondary welding on the tab and the conductive member comprises:

performing multiple turns of welding on the tab and the conductive member in a peripheral direction from inside to outside so as to form the second fused portion.

16. The tab welding method according to claim 15, wherein a welding temperature of each turn gradually decreases from inside to outside.

17. A tab welded structure, comprising:

a tab formed by stacking a plurality of layers of pieces in a first direction; and a conductive member welded to the tab to form a fused area;

wherein the fused area comprises:

a first fused portion extending from the tab into the conductive member in the first direction; and a second fused portion demarcated from the first fused portion, the second fused portion being located at a side portion of the first fused portion, and the second fused portion being configured to be connected to the first fused portion and the tab;

wherein:

the first fused portion is a solid fused area in a top view along the first direction;

the second fused portion is arranged on an outer peripheral side of the first fused portion, and the second fused portion extends in a distributed manner in a peripheral direction of the first fused portion; and a welding temperature at which the conductive member and the tab are welded to form the second fused portion is less than a welding temperature at which the conductive member and the tab are welded to form the first fused portion.

* * * * *